(12) United States Patent
Budnick

(10) Patent No.: US 10,472,987 B2
(45) Date of Patent: Nov. 12, 2019

(54) HEAT SHIELD FOR A CASING

(71) Applicant: United Technologies Corporation, Hartford, CT (US)

(72) Inventor: Matthew Budnick, Hudson, NH (US)

(73) Assignee: United Technologies Corporation, Farmington, CT (US)

( * ) Notice: Subject to any disclaimer, the term of this patent is extended or adjusted under 35 U.S.C. 154(b) by 941 days.

(21) Appl. No.: 14/655,805

(22) PCT Filed: Dec. 19, 2013

(86) PCT No.: PCT/US2013/076385
§ 371 (c)(1),
(2) Date: Jun. 26, 2015

(87) PCT Pub. No.: WO2014/105602
PCT Pub. Date: Jul. 3, 2014

(65) Prior Publication Data
US 2015/0345329 A1 Dec. 3, 2015

Related U.S. Application Data

(60) Provisional application No. 61/747,237, filed on Dec. 29, 2012.

(51) Int. Cl.
*F01D 25/14* (2006.01)
*F01D 25/24* (2006.01)
(Continued)

(52) U.S. Cl.
CPC ........... *F01D 25/145* (2013.01); *F01D 9/065* (2013.01); *F01D 25/162* (2013.01); *F01D 25/24* (2013.01);
(Continued)

(58) Field of Classification Search
CPC .............................. F01D 25/24; F01D 25/145
See application file for complete search history.

(56) References Cited

U.S. PATENT DOCUMENTS 2,214,108 A 7/1938 Grece
2,869,941 A 1/1959 Shoup et al.
(Continued)

FOREIGN PATENT DOCUMENTS

CH 705513 A2 3/2013
EP 2187019 A1 5/2010
(Continued)

OTHER PUBLICATIONS

International Searching Authority, PCT Notification of the Transmittal of the International Search Report and the Written Opinion, dated Apr. 11, 2014, 15 pages.

*Primary Examiner* — Carlos A Rivera
*Assistant Examiner* — Cameron A Corday
(74) *Attorney, Agent, or Firm* — Kinney & Lange, P.A.

(57) ABSTRACT

A gas turbine engine includes a casing, a fairing, and a heat shield. The fairing is annularly shaped and disposed adjacent the casing. The heat shield is connected to the casing and includes a first portion and a second portion. The first portion is generally cylindrically shaped and extends between the fairing and the casing and the second portion extends generally radially away from the casing and the first portion toward the fairing.

17 Claims, 4 Drawing Sheets

(51) Int. Cl.
*F01D 25/28* (2006.01)
*F01D 9/06* (2006.01)
*F01D 25/16* (2006.01)
*F02C 7/12* (2006.01)
*F02C 7/28* (2006.01)

(52) U.S. Cl.
CPC ............... *F01D 25/28* (2013.01); *F02C 7/12* (2013.01); *F02C 7/28* (2013.01); F05D 2220/32 (2013.01); F05D 2260/231 (2013.01); Y02T 50/675 (2013.01); Y10T 29/49321 (2015.01)

(56) References Cited

U.S. PATENT DOCUMENTS

| | | |
|---|---|---|
| 2,928,648 A | 3/1960 | Haines et al. |
| 3,576,328 A | 4/1971 | Vose |
| 3,802,046 A | 4/1974 | Wachtell et al. |
| 3,970,319 A | 7/1976 | Carroll et al. |
| 4,009,569 A | 3/1977 | Kozlin |
| 4,044,555 A | 4/1977 | McLoughlin et al. |
| 4,088,422 A | 5/1978 | Martin |
| 4,114,248 A | 9/1978 | Smith et al. |
| 4,305,697 A | 12/1981 | Cohen et al. |
| 4,321,007 A | 3/1982 | Dennison et al. |
| 4,369,016 A | 1/1983 | Dennison |
| 4,478,551 A | 10/1984 | Honeycutt, Jr. et al. |
| 4,645,217 A | 2/1987 | Honeycutt, Jr. et al. |
| 4,678,113 A | 7/1987 | Bridges et al. |
| 4,738,453 A | 4/1988 | Ide |
| 4,756,536 A | 7/1988 | Belcher |
| 4,793,770 A | 12/1988 | Schonewald et al. |
| 4,920,742 A * | 5/1990 | Nash ............... F01D 25/162 415/116 |
| 4,987,736 A | 1/1991 | Ciokajlo et al. |
| 4,989,406 A | 2/1991 | Vdoviak et al. |
| 4,993,918 A | 2/1991 | Myers et al. |
| 5,031,922 A | 7/1991 | Heydrich |
| 5,042,823 A | 8/1991 | Mackay et al. |
| 5,071,138 A | 12/1991 | Mackay et al. |
| 5,076,049 A | 12/1991 | VonBenken et al. |
| 5,100,158 A | 3/1992 | Gardner |
| 5,108,116 A | 4/1992 | Johnson et al. |
| 5,169,159 A | 12/1992 | Pope et al. |
| 5,174,584 A | 12/1992 | Lahrman |
| 5,188,507 A | 2/1993 | Sweeney |
| 5,211,536 A | 5/1993 | Ackerman et al. |
| 5,211,541 A | 5/1993 | Fledderjohn et al. |
| 5,236,302 A | 8/1993 | Weisgerber et al. |
| 5,246,295 A | 9/1993 | Ide |
| 5,265,807 A | 11/1993 | Steckbeck et al. |
| 5,269,057 A | 12/1993 | Mendham |
| 5,271,714 A | 12/1993 | Shepherd et al. |
| 5,272,869 A | 12/1993 | Dawson et al. |
| 5,273,397 A | 12/1993 | Czachor et al. |
| 5,289,677 A | 3/1994 | Jarrell |
| 5,292,227 A | 3/1994 | Czachor et al. |
| 5,312,227 A | 5/1994 | Grateau et al. |
| 5,338,154 A | 8/1994 | Meade et al. |
| 5,357,744 A | 10/1994 | Czachor et al. |
| 5,370,402 A | 12/1994 | Gardner et al. |
| 5,385,409 A | 1/1995 | Ide |
| 5,401,036 A | 3/1995 | Basu |
| 5,438,756 A | 8/1995 | Halchak et al. |
| 5,474,305 A | 12/1995 | Flower |
| 5,483,792 A | 1/1996 | Czachor et al. |
| 5,558,341 A | 9/1996 | McNickle et al. |
| 5,597,286 A | 1/1997 | Dawson et al. |
| 5,605,438 A | 2/1997 | Burdgick et al. |
| 5,609,467 A | 3/1997 | Lenhart et al. |
| 5,632,493 A | 5/1997 | Gardner |
| 5,634,767 A | 6/1997 | Dawson |
| 5,691,279 A | 11/1997 | Tauber et al. |
| 5,755,445 A | 5/1998 | Arora |
| 5,851,105 A | 12/1998 | Fric et al. |
| 5,911,400 A | 6/1999 | Niethammer et al. |
| 6,163,959 A | 12/2000 | Arraitz et al. |
| 6,196,550 B1 | 3/2001 | Arora et al. |
| 6,227,800 B1 | 5/2001 | Spring et al. |
| 6,337,751 B1 | 1/2002 | Kimizuka |
| 6,343,912 B1 | 2/2002 | Mangeiga et al. |
| 6,358,001 B1 | 3/2002 | Bosel et al. |
| 6,364,316 B1 | 4/2002 | Arora |
| 6,439,841 B1 | 8/2002 | Bosel |
| 6,463,739 B1 | 10/2002 | Mueller et al. |
| 6,511,284 B2 | 1/2003 | Darnell et al. |
| 6,578,363 B2 | 6/2003 | Hashimoto et al. |
| 6,601,853 B2 | 8/2003 | Inoue |
| 6,612,807 B2 | 9/2003 | Czachor |
| 6,619,030 B1 | 9/2003 | Seda et al. |
| 6,638,013 B2 | 10/2003 | Nguyen et al. |
| 6,652,229 B2 | 11/2003 | Lu |
| 6,672,833 B2 | 1/2004 | MacLean et al. |
| 6,719,524 B2 | 4/2004 | Nguyen et al. |
| 6,736,401 B2 | 5/2004 | Chung et al. |
| 6,792,758 B2 | 9/2004 | Dowman |
| 6,796,765 B2 | 9/2004 | Kasel et al. |
| 6,805,356 B2 | 10/2004 | Inoue |
| 6,811,154 B2 | 11/2004 | Proctor et al. |
| 6,935,631 B2 | 8/2005 | Inoue |
| 6,969,826 B2 | 11/2005 | Trewiler et al. |
| 6,983,608 B2 | 1/2006 | Allen, Jr. et al. |
| 7,055,305 B2 | 6/2006 | Baxter et al. |
| 7,094,026 B2 | 8/2006 | Coign et al. |
| 7,100,358 B2 | 9/2006 | Gekht et al. |
| 7,200,933 B2 | 4/2007 | Lundgren et al. |
| 7,229,249 B2 | 6/2007 | Durocher et al. |
| 7,238,008 B2 | 7/2007 | Bobo et al. |
| 7,367,567 B2 | 5/2008 | Farah et al. |
| 7,371,044 B2 | 5/2008 | Nereim |
| 7,389,583 B2 | 6/2008 | Lundgren |
| 7,614,150 B2 | 11/2009 | Lundgren |
| 7,631,879 B2 | 12/2009 | Diantonio |
| 7,673,461 B2 | 3/2010 | Cameriano et al. |
| 7,677,047 B2 | 3/2010 | Somanath et al. |
| 7,735,833 B2 | 6/2010 | Braun et al. |
| 7,798,768 B2 | 9/2010 | Strain et al. |
| 7,815,417 B2 | 10/2010 | Somanath et al. |
| 7,824,152 B2 | 11/2010 | Morrison |
| 7,891,165 B2 | 2/2011 | Bader et al. |
| 7,909,573 B2 | 3/2011 | Cameriano et al. |
| 7,955,446 B2 | 6/2011 | Dierberger |
| 7,959,409 B2 | 6/2011 | Guo et al. |
| 7,988,799 B2 | 8/2011 | Dierberger |
| 8,069,648 B2 | 12/2011 | Snyder et al. |
| 8,083,465 B2 | 12/2011 | Herbst et al. |
| 8,091,371 B2 | 1/2012 | Durocher et al. |
| 8,092,161 B2 | 1/2012 | Cai et al. |
| 8,152,451 B2 | 4/2012 | Manteiga et al. |
| 8,162,593 B2 | 4/2012 | Guimbard et al. |
| 8,172,526 B2 | 5/2012 | Lescure et al. |
| 8,177,488 B2 | 5/2012 | Manteiga et al. |
| 8,221,071 B2 | 7/2012 | Wojno et al. |
| 8,245,399 B2 | 8/2012 | Anantharaman et al. |
| 8,245,518 B2 | 8/2012 | Durocher et al. |
| 8,282,342 B2 | 10/2012 | Tonks et al. |
| 8,371,127 B2 | 2/2013 | Durocher et al. |
| 8,371,812 B2 | 2/2013 | Manteiga et al. |
| 9,133,723 B2 * | 9/2015 | Vo .............. F01D 9/04 |
| 2002/0182058 A1 | 12/2002 | Darnell et al. |
| 2003/0025274 A1 | 2/2003 | Allan et al. |
| 2003/0042682 A1 | 3/2003 | Inoue |
| 2003/0062684 A1 | 4/2003 | Inoue |
| 2003/0062685 A1 | 4/2003 | Inoue |
| 2005/0046113 A1 | 3/2005 | Inoue |
| 2005/0050898 A1 | 3/2005 | Noda |
| 2006/0010852 A1 | 1/2006 | Gekht et al. |
| 2006/0123796 A1 | 6/2006 | Aycock et al. |
| 2007/0025847 A1 | 2/2007 | Wakazono et al. |
| 2008/0216300 A1 | 9/2008 | Anderson et al. |
| 2010/0054927 A1 | 3/2010 | Almstedt et al. |
| 2010/0132371 A1 | 6/2010 | Durocher et al. |
| 2010/0132374 A1 | 6/2010 | Manteiga et al. |

(56) References Cited

U.S. PATENT DOCUMENTS

| | | |
|---|---|---|
| 2010/0132377 A1 | 6/2010 | Durocher et al. |
| 2010/0202872 A1 | 8/2010 | Weidmann |
| 2010/0236244 A1 | 9/2010 | Longardner |
| 2010/0275572 A1 | 11/2010 | Durocher et al. |
| 2010/0275614 A1 | 11/2010 | Fontaine et al. |
| 2010/0307165 A1 | 12/2010 | Wong et al. |
| 2011/0000223 A1 | 1/2011 | Russberg |
| 2011/0005234 A1 | 1/2011 | Hashimoto et al. |
| 2011/0020116 A1 | 1/2011 | Hashimoto et al. |
| 2011/0061767 A1 | 3/2011 | Vontell et al. |
| 2011/0081237 A1* | 4/2011 | Durocher .............. F01D 9/06 415/173.1 |
| 2011/0081239 A1 | 4/2011 | Durocher |
| 2011/0081240 A1 | 4/2011 | Durocher et al. |
| 2011/0085895 A1 | 4/2011 | Durocher et al. |
| 2011/0214433 A1 | 9/2011 | Feindel et al. |
| 2011/0262277 A1 | 10/2011 | Sjoqvist et al. |
| 2011/0302929 A1 | 12/2011 | Bruhwiler |
| 2012/0111023 A1 | 5/2012 | Sjoqvist et al. |
| 2012/0156020 A1 | 6/2012 | Kottilingam et al. |
| 2012/0186254 A1 | 7/2012 | Ito et al. |
| 2012/0204569 A1* | 8/2012 | Schubert .............. F01D 25/30 60/772 |
| 2012/0227371 A1 | 9/2012 | Johnson et al. |
| 2013/0011242 A1 | 1/2013 | Beeck et al. |
| 2013/0223982 A1 | 8/2013 | Durocher et al. |
| 2014/0007588 A1* | 1/2014 | Sanchez .............. F01D 9/065 60/796 |

FOREIGN PATENT DOCUMENTS

| | | |
|---|---|---|
| WO | WO 03/020469 A1 | 3/2003 |
| WO | WO 2006/007686 A1 | 1/2006 |
| WO | WO 2009/157817 A1 | 12/2009 |
| WO | WO 2010/002295 A1 | 1/2010 |
| WO | WO 2010002296 A1 | 1/2010 |
| WO | WO 2011129724 A1 | 10/2011 |
| WO | WO 2012/158070 A1 | 11/2012 |

* cited by examiner

HEAT SHIELD FOR A CASING

BACKGROUND

The disclosure relates to gas turbine engines, and more particularly to heat shields used in gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

For many stator vane assemblies, a fairing is disposed about a frame in order to define a main gas flow path for the gas turbine engine. As the fairing is directly exposed to gas flow including combustion gases, the fairing can be heated to high temperatures during operation. Heat from the fairing can heat the frame in an undesirable manner.

SUMMARY

A gas turbine engine includes a casing, a fairing, and a heat shield. The fairing is annularly shaped and disposed adjacent the casing. The heat shield is connected to the casing and includes a first portion and a second portion. The first portion is generally cylindrically shaped and extends between the fairing and the casing and the second portion extends generally radially away from the casing and the first portion toward the fairing.

A heat shield assembly for a gas turbine engine includes a mounting region, a segment of a cylinder portion, and a flange. The segment of the cylinder portion is supported from the mounting region and has an edge that forms a notch. The flange is supported from the mounting region. The flange extends away from the mounting portion and the segment of the cylinder portion.

A method includes disposing the plurality of heat shield segments adjacent a casing and between a plurality of struts that extend from the casing, connecting the segments to the casing, and attaching the segments together to form a heat shield having a first portion positioned adjacent the casing and a second portion extending away from the casing.

DETAILED DESCRIPTION

This application discloses a shaped heat shield with a segmented cylinder portion that is disposed along an inner case of the frame to protect the inner case of the frame from radiation heating. The heat shield is additionally mounted to the inner case and has a flange that extends radially outward from the inner case and is disposed adjacent a seal support of the frame. The heat shield design blocks radiation heating from the inner case and seal support, and therefore, allows less expensive materials (steel) to be used for those components.

Figure 1:
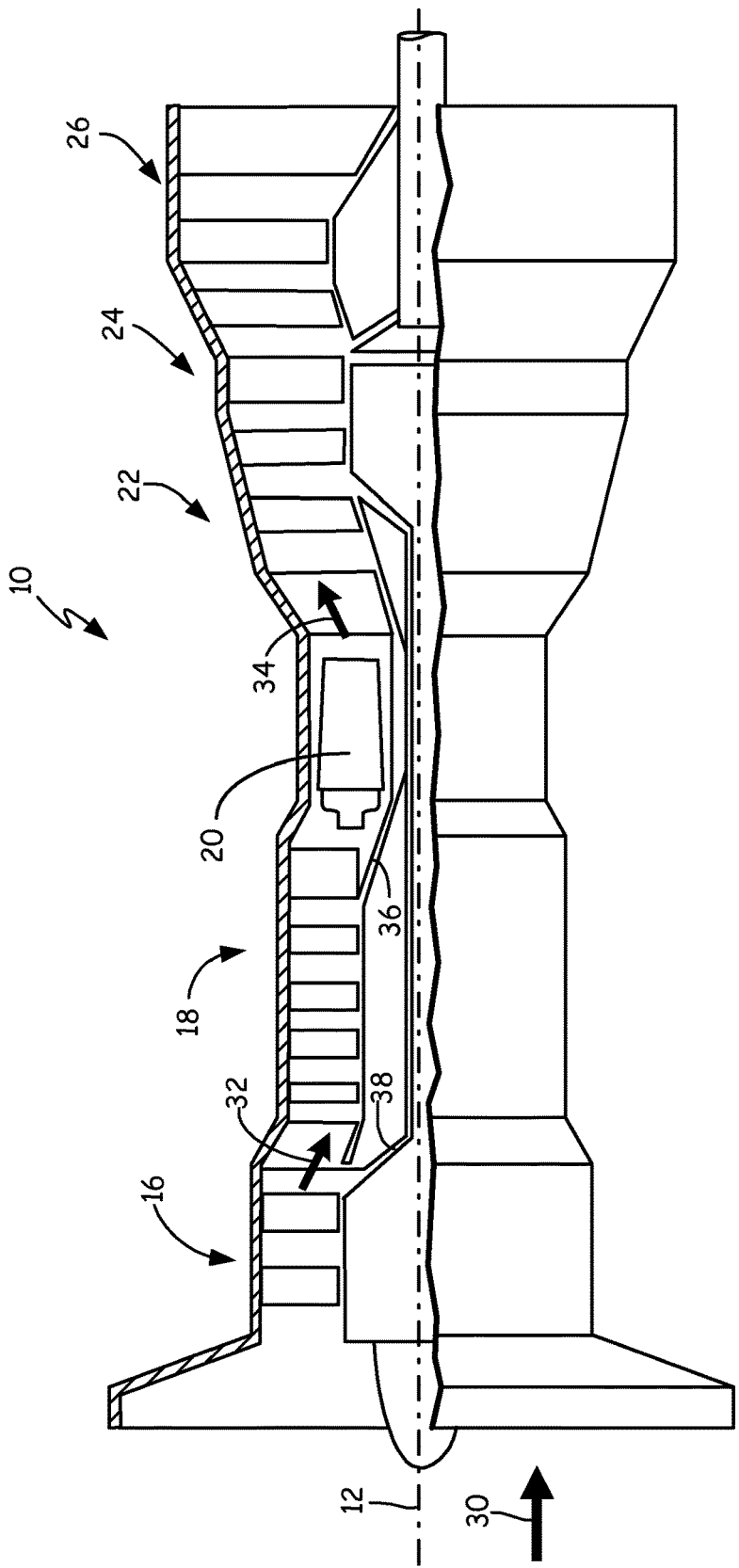
FIG. 1 is an industrial turbine cross-section.

An exemplary industrial gas turbine engine 10 is circumferentially disposed about a central, longitudinal axis or axial engine centerline axis 12 as illustrated in FIG. 1. The engine 10 includes, in series order from front to rear, low and high pressure compressor sections 16 and 18, combustor section 20 and high and low pressure turbine sections 22 and 24. In some examples, free turbine section 26 is disposed aft of low pressure turbine 24. Although illustrated with reference to an industrial gas turbine engine, this application also extends to aero engines with a fan or gear driven fan, and engines with more or fewer sections than illustrated.

In gas turbines, incoming ambient air 30 becomes pressurized air 32 in compressors 16 and 18. Fuel mixes with the pressurized air 32 in combustor section 20, where it is burned to produce combustion gases 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown).

It is understood that FIG. 1 provides a basic understanding and overview of the various sections and the basic operation of an industrial gas turbine engine. The present application is applicable to all types of gas turbine engines, including those with aerospace applications.

Figure 2:
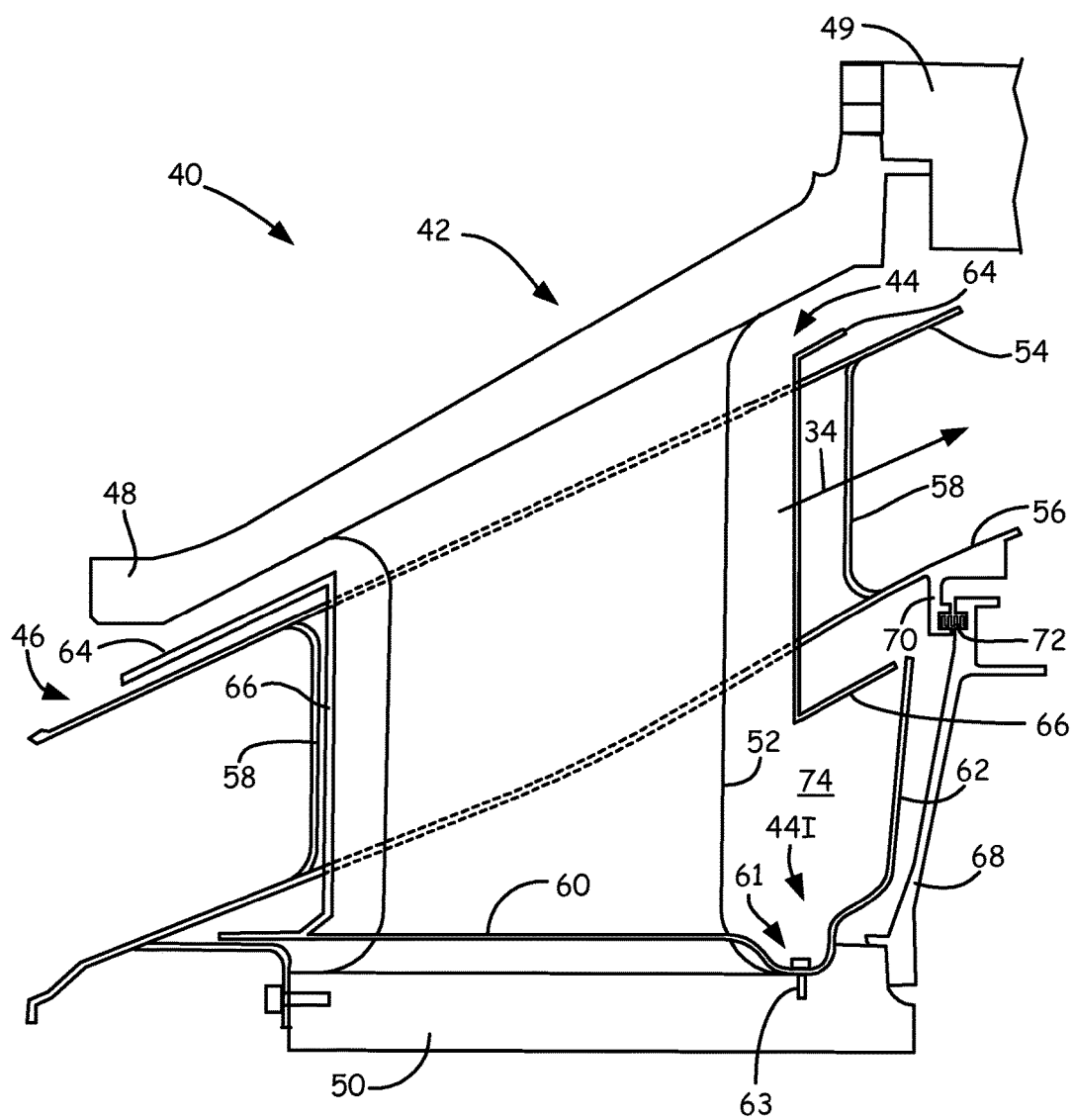
FIG. 2 is a cross-section of an assembly including a frame, a fairing, and a heat shield arranged together.
Figure 2A:
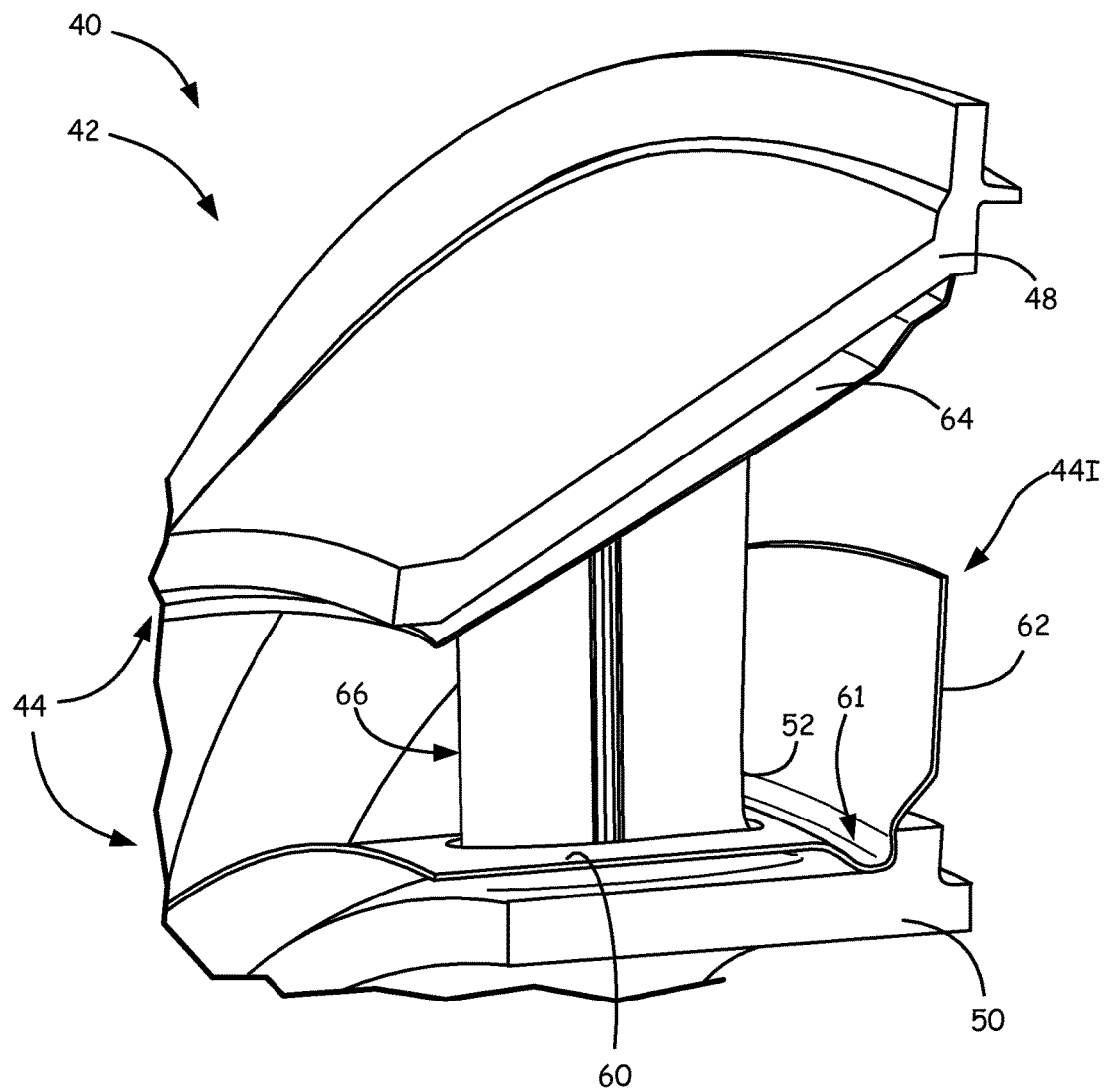
FIG. 2A is a perspective view of a segment of the frame of FIG. 2 with heat shields mounted within the frame.

FIG. 2 shows a cross-section of assembly 40 with heat shield 44 installed between frame 42 and fairing 46. FIG. 2A shows a perspective view of a section of assembly 40 with fairing 46 removed. Assembly 40 includes frame 42, heat shield 44, and fairing 46. Frame 42 includes outer radial casing 48, inner radial casing 50, struts 52, and seal support 68. Fairing 46 (only shown in FIG. 2) includes outer radial platform 54, inner radial platform 56, strut liners 58, and rib 70. Heat shield 44 includes inner radial shield 441, outer radial shield 64, and strut shields 66. Inner radial shield 441 includes cylindrical section 60, mounting region 61, and flange 62.

Frame 42 comprises a stator component of gas turbine engine 10 (FIG. 1) and can form portions of compressor sections 16 and 18 or turbine sections 22 and 24. Heat shield 44 and fairing 46 are shown installed within frame 42 in FIG. 2. Both heat shield 44 and fairing 46 are connected to frame 42. In FIG. 2, heat shield 44 is connected to frame 42 in a different location than fairing 46. Fairing 46 is disposed within frame 42 to form the main gas flow path for a portion of gas turbine engine 10. It should be understood that the embodiments of heat shield 44 are provided in relation to a specific embodiment of frame 42, in particular, a frame that comprises a low pressure turbine exhaust case, but heat shield 44 described is applicable to other gas turbine sections and elements including stator vane components.

As illustrated in FIGS. 2 and 2A, outer radial casing 48 of frame 42 is conically shaped and forms a portion of the casing of gas turbine engine 10 (FIG. 1), for example, in low pressure turbine section 24. As shown in FIG. 2, outer radial casing 48 abuts and is connected to second outer radial casing 49 of another module of gas turbine engine 10. Inner radial casing 50 is disposed generally radially inward of outer radial casing 48 and is connected thereto by struts 52 (only one is shown in FIGS. 2 and 2A). Seal support 68 is connected to inner radial casing 50 and extends toward the outer radial casing 48 and fairing 46.

Fairing 46 is adapted to be disposed within frame 42 between outer radial casing 48 and inner radial casing 50. Outer radial platform 54 of fairing 46 has a generally conical shape. Similarly, inner radial platform 56 has a generally conical shape. Rib 70 extends generally radially from an aft portion of inner radial platform 56 adjacent seal support 68. Inner radial platform 56 is spaced from outer radial platform 54 by strut liners 58. Strut liners 58 are adapted to be disposed around struts 52 of frame 42 as well as strut shields 66 of heat shield 44 when fairing 46 is assembled on frame 42 as illustrated in FIG. 2. As discussed previously, outer radial platform 54, inner radial platform 56, and strut liners 58 form the main gas flow path, which directs combustion gases 34 through the portion of gas turbine engine illustrated in FIG. 2.

Heat shield 44 is disposed between frame 42 and fairing 46. In one embodiment, heat shield is comprised of a nickel alloy sheet metal. As illustrated in FIGS. 2 and 2A, inner radial shield 441, which is a subassembly of heat shield 44, is affixed to and extends generally along inner radial casing 50 and seal support 68. In particular, cylindrical section 60 is disposed adjacent to and extends axially across inner casing 50. Cylindrical section 60 transitions to or is connected to mounting region 61, which is adapted to be affixed to inner radial casing 50. In the embodiment shown in FIGS. 2 and 2A, inner radial shield 441 is supported by mounting region 61 from inner radial casing 50. In the embodiment shown in FIG. 2, mounting region 61 is affixed to frame 42 by fasteners 63. In other embodiments, mounting region 61 can be affixed to frame 42 by welding, riveting, brazing, bolting, or other connection. Heat shield 441 is disposed between inner radial casing 50 and fairing 46 to block line-of-sight from inner radial casing 50 to frame 42. As used therein, block line-of-sight means that no portion of frame 42 (for example casing 50) is exposed to fairing 46 travelling axially from a forward end of frame 42 to an aft end. Thus, to block line-of-sight a part of heat shield assembly 441 is interposed between inner radial casing 50 and fairing 46.

Flange 62 extends generally radially from mounting region 61 toward fairing 46 and strut shields 66. In particular, flange 62 is disposed adjacent to and extends along a length of seal support 68 to adjacent rib 70 and seal 72. Rib 70 provides stiffness to fairing 46 and retains seal 70, which is also retained by seal support 68. Together, fairing 46, seal 70, and seal support 68 regulate the flow of a secondary air within assembly 40. In the embodiment of FIG. 2, flange 62 is disposed with a small gap relative to strut shields 66. Strut shields 66 extend about struts 52 (only one is shown in FIGS. 2 and 2A) and are disposed between strut liner 58 and struts 52. Each strut shield 66 extends generally radially and is connected to outer radial shield 64. Outer radial shield 64 is disposed between outer radial casing 48 and outer radial platform 54. In one embodiment, outer radial shield 64 is comprised of a single annular ring and a plurality of strut shields 66 extend circumferentially from the outer radial shield 64 and are disposed within strut liner 58.

Strut shields 66 can initially be divided (as illustrated in FIG. 2A) for installation around struts 52. Outer radial shield 64 and strut shields 66 can be connected together by welding, brazing, riveting or other means.

Inner radial shield 441, including cylindrical section 60 and flange 62, along with struts 52 and strut shield 66, act to define cavity 74. In some embodiments, cavity 74 can contain secondary air.

In the embodiment shown in FIGS. 2 and 2A, strut shields 66 and outer radial shield 64 are connected to one another by welding, riveting, brazing, or other means. In other embodiments, strut shields 66 and outer radial shield 64 can comprise separate components, can be axially or otherwise segmented, or can comprise subassemblies of several components. Similarly, in the embodiment shown in FIGS. 2 and 2A, inner radial shield 441 including cylindrical section 60, mounting region 61, and flange 62 comprise a single unitary component that is formed by machining, rolling, stamping, curling, punching, and/or another method of fabrication. In other embodiments, inner radial shield 441 can comprise separate components, can be axially or otherwise segmented, or can comprise subassemblies of several components. For example, in other embodiments, one or more components of heat shield 441 such as cylindrical section 60, mounting region 61, and flange 62 may not be connected together but instead can be disposed with gaps therebetween.

Figure 3:
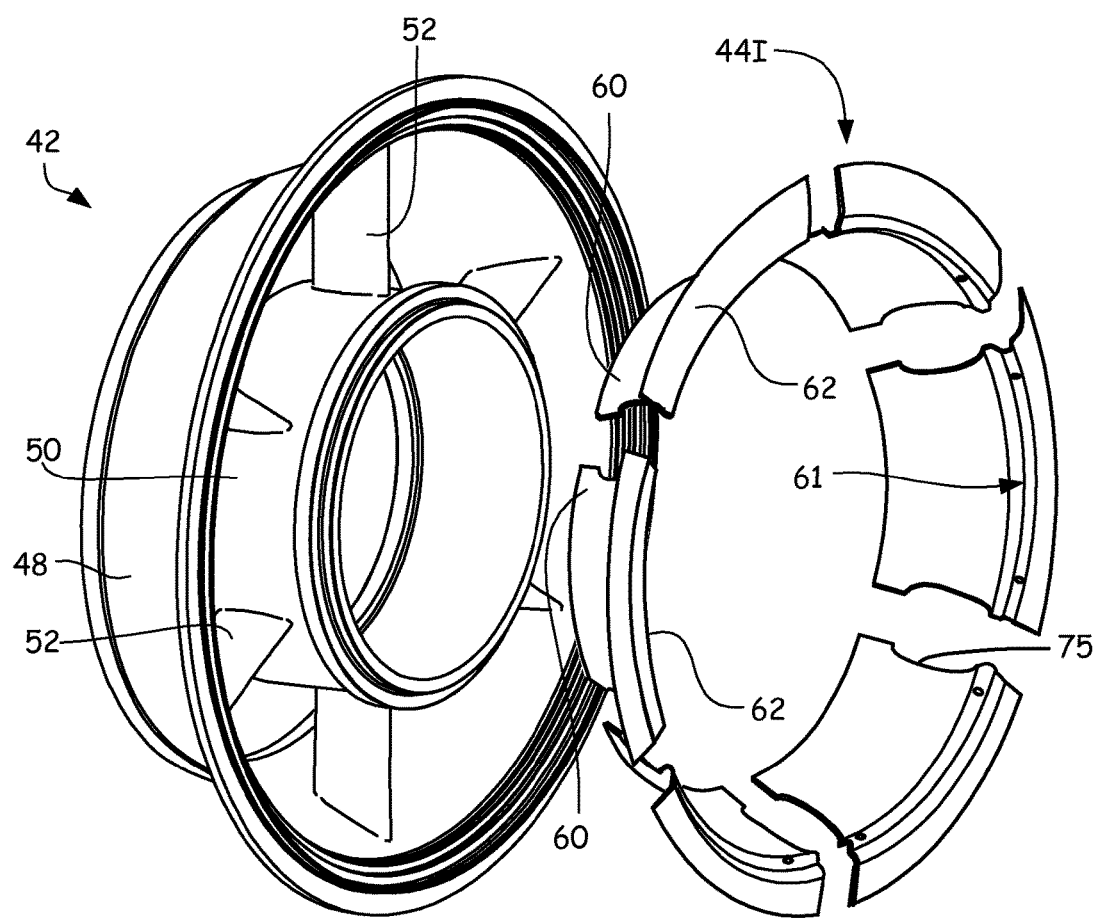
FIG. 3 illustrates segments of an inner radial shield being inserted into the frame.

In FIG. 3 a plurality of heat shield segments are joined together to form an annular body. FIG. 3 is an exploded view of frame 42 and inner radial shield 441 with fairing 46 (FIG. 2) and the remainder of heat shield 44 (FIGS. 2 and 2A) removed. In addition to showing components of frame 42 including outer radial casing 48, inner radial casing 50, and struts 52, FIG. 3 illustrates that cylindrical section 60, mounting region 61, and flange 62 are circumferentially segmented. In the embodiment of FIG. 3, inner shield 441 is divided into six separate segments. The segments are adapted to interface with one another when installed and are connected to one another by welding, riveting, brazing, or other means. As shown in FIG. 3, cylindrical sections 60 can be assembled to comprise a full cylinder about struts 52 of frame 42. In the embodiment of FIG. 3, cylindrical sections 60 include notches 75 along the axially extending edges thereof. These notches are adapted to receive the base of struts 52 therein. Axially extending edges of cylindrical sections 60 are adapted to interface and abut with one another forward and aft of notches. When assembled, cylindrical sections 60 are then attached together forward and aft of struts 52.

As shown in FIG. 3, the segments of inner radial shield 441 are disposed adjacent inner radial casing 50 and between struts 52 that extend from inner radial casing 50. Inner radial shield 441 is inserted into frame 42 and is connected to inner radial casing 50, for example, via mounting region 61 and fasteners 63 (FIG. 1). After being inserted and connected to frame 42, the segments of inner radial shield 441 can be joined together to form a full assembly.

This application discloses a shaped heat shield with a segmented cylinder portion that is disposed along an inner case of the frame to protect the inner case of the frame from radiation heating. The heat shield is additionally mounted to the inner case and has a flange that extends radially outward from the inner case and is disposed adjacent a seal support of the frame. The heat shield design blocks radiation heating from the inner case and seal support, and therefore, allows less expensive materials (steel) to be used for those components.

Discussion of Possible Embodiments

The following are non-exclusive descriptions of possible embodiments of the present invention.

A gas turbine engine includes a casing, a fairing, and a heat shield. The fairing is annularly shaped and disposed adjacent the casing. The heat shield is connected to the casing and includes a first portion and a second portion. The first portion is generally cylindrically shaped and extends between the fairing and the casing and the second portion extends generally radially away from the casing and the first portion toward the fairing.

The gas turbine of the preceding paragraph can optionally include, additionally and/or alternatively, any one or more of the following features, configurations and/or additional components:

the casing comprises a portion of a frame that includes struts that extend between an inner radial casing and an outer radial casing;

the first portion and second portion define a portion of a cavity that extends about a portion of the struts;

the casing includes a seal support that is connected to the inner radial casing and extends toward the outer radial casing;

the second portion is disposed adjacent to and extends along a length of the seal support;

together the first portion and the second portion block all line-of-sight from the fairing to the casing and seal support;

the first portion is comprised of a plurality of connected arcuate segments; and the arcuate segments have an edge that defines a notch adapted to receive the strut.

A heat shield assembly for a gas turbine engine includes a mounting region, a segment of a cylinder portion, and a flange. The segment of the cylinder portion is supported from the mounting region and has an edge that forms a notch. The flange is supported from the mounting region. The flange extends away from the mounting portion and the segment of the cylinder portion.

The heat shield assembly of the preceding paragraph can optionally include, additionally and/or alternatively, any one or more of the following features, configurations and/or additional components:

a frame including struts extending between a inner radial casing and a outer radial casing;

the notch is adapted to receive the strut;

the mounting region is connected to the inner radial casing;

the flange extends away from the inner radial casing toward the outer radial casing;

a seal support mounted to the inner radial casing and extending toward the outer radial casing, and the flange is disposed adjacent to and extends along a length of the seal support;

the segment of the cylinder portion is disposed adjacent to and extends along the inner radial casing;

the segment of the cylinder portion is joined to comprise a full ring; and the notch is adapted to receive the strut.

A method includes disposing the plurality of heat shield segments adjacent a casing and between a plurality of struts that extend from the casing, connecting the segments to the casing, and attaching the segments together to form a heat shield having a first portion positioned adjacent the casing and a second portion extending away from the casing.

The method of the preceding paragraph can optionally include, additionally and/or alternatively, any one or more of the following features, configurations and/or additional components:

the segments are attached together forward and aft of the struts; and disposing a support arm adjacent the second segment, and connecting a support arm to the casing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
   a frame comprising:
      an outer radial casing;
      an inner radial casing; and
      a plurality of struts that extend between the inner radial casing and the outer radial casing;
   an annularly shaped fairing disposed adjacent the inner radial casing;
   a rib protruding from the annularly shaped fairing and extending in a circumferential direction;
   a heat shield connected to the inner radial casing and including a first portion and a second portion, wherein the first portion is cylindrically shaped and extends between the fairing and the inner radial casing and the second portion extends radially away from the inner radial casing and the first portion toward the fairing;
   a seal support that is connected to the inner radial casing and extends toward the outer radial casing; and
   a seal retained by and between the rib and the seal support.

2. The engine of claim 1, wherein the first portion and second portion define a portion of a cavity that extends about a portion of the struts.

3. The engine of claim 1, wherein the second portion is disposed adjacent to and extends along a length of the seal support.

4. The engine of claim 3, wherein the second portion is spaced from the seal support to form a gap between the second portion and the seal support.

5. The engine of claim 1, wherein together the first portion and the second portion block all line-of-sight from the fairing to the casing and seal support.

6. The engine of claim 1, wherein the first portion is comprised of a plurality of connected arcuate segments.

7. The engine of claim 6, wherein the arcuate segments each have an edge that defines a notch adapted to receive one of the struts.

8. A heat shield assembly for a gas turbine engine, comprising:
   a plurality of unitary heat shield segments, each unitary heat shield segment subtending a sector of a full ring, the unitary heat shield segment comprising:
      a mounting region;
      a cylinder portion supported from the mounting region, wherein the cylinder portion has a first edge that forms a first notch; and
      a flange supported from the mounting region, wherein the flange extends away from the mounting region and the cylinder portion;
   wherein the unitary heat shield segments are circumferentially spaced, each unitary heat shield segment abutting circumferentially adjacent unitary heat shield segments to form a full ring; and
   a frame comprising:
      an inner radial casing;

an outer radial casing; and
a plurality of struts extending from the inner radial casing to the outer radial casing to connect the inner radial casing to the outer radial casing;
wherein notches of circumferentially adjacent unitary heat shield segments are adapted to form a socket that receives one of the struts.

9. The heat shield assembly of claim 8, wherein each flange extends away from the inner radial casing toward the outer radial casing.

10. The heat shield assembly of claim 8, and further comprising:
a seal support mounted to the inner radial casing and extending toward the outer radial casing, wherein the flanges are disposed adjacent to and extend along a length of the seal support.

11. The heat shield assembly of claim 10, and further comprising:
an annularly shaped fairing disposed adjacent the inner radial casing, wherein the cylinder portions of the plurality of unitary heat shield segments extend between the faring and the inner radial casing, and wherein the flanges of the plurality of unitary heat shield segments are spaced from the seal support to form a gap therebetween, each flange extending radially away from the inner radial casing towards the toward the annularly shaped fairing;
a rib protruding from the annularly shaped fairing and extending in a circumferential direction; and
a seal retained by and between the rib and the seal support.

12. The heat shield assembly of claim 8, wherein the cylinder portions are disposed adjacent to and extend along the inner radial casing.

13. The heat shield assembly of claim 8, wherein at least one of the mounting regions is connected to the inner radial casing.

14. The heat shield assembly of claim 8, wherein a second edge of the cylinder portion circumferentially spaced from the first edge of the cylinder portion forms a second notch.

15. A method comprising:
disposing a plurality of unitary heat shield segments between a casing and a fairing, wherein the unitary heat shield segments are circumferentially spaced, each unitary heat shield segment subtending a sector of a full ring and abutting circumferentially adjacent unitary heat shield segments to form a full ring, and wherein the unitary heat shield segments are disposed adjacent the casing, each unitary heat shield segment disposed between two struts of a plurality of struts that extend from the casing;
connecting the unitary segments to the casing; and
attaching the segments together to form a heat shield, each of the unitary segments having a first portion positioned adjacent the casing and a second portion extending away from the casing.

16. The method of claim 15, wherein the unitary segments are attached together forward and aft of the struts.

17. The method of claim 15, further comprising:
disposing a support arm adjacent the second portions and spaced from the second portions to form a gap between the second portions and the support arm; and
connecting the support arm to the casing.

* * * * *